June 5, 1951  A. L. HAMM  2,555,337
CHEMICAL FURNACE AND RECOVERY UNIT
Filed April 11, 1945  4 Sheets-Sheet 1

INVENTOR
Alexander L. Hamm
BY
ATTORNEYS

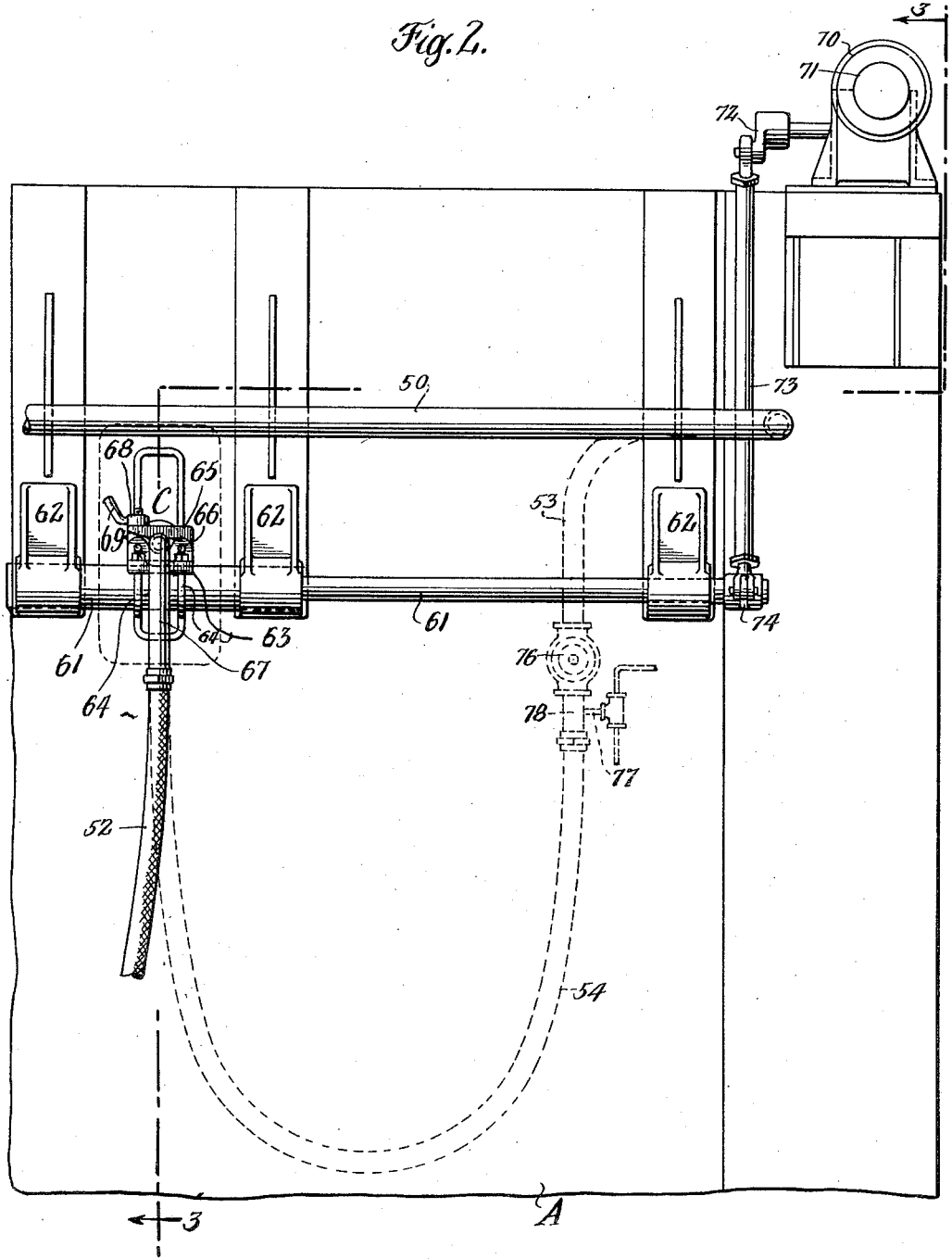

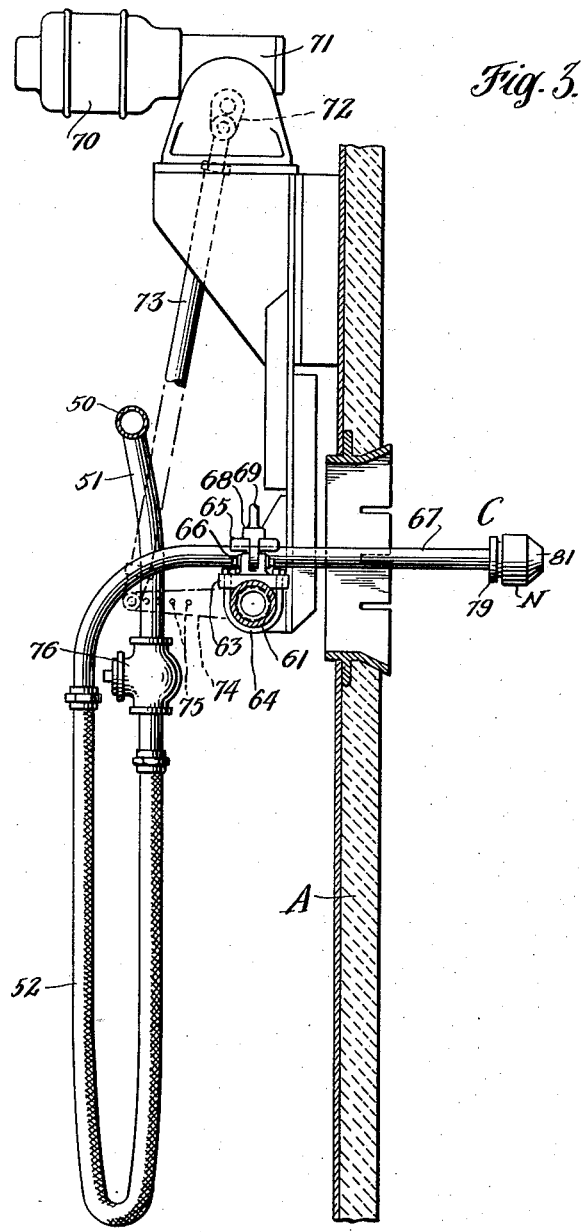

June 5, 1951 A. L. HAMM 2,555,337
CHEMICAL FURNACE AND RECOVERY UNIT
Filed April 11, 1945 4 Sheets-Sheet 4
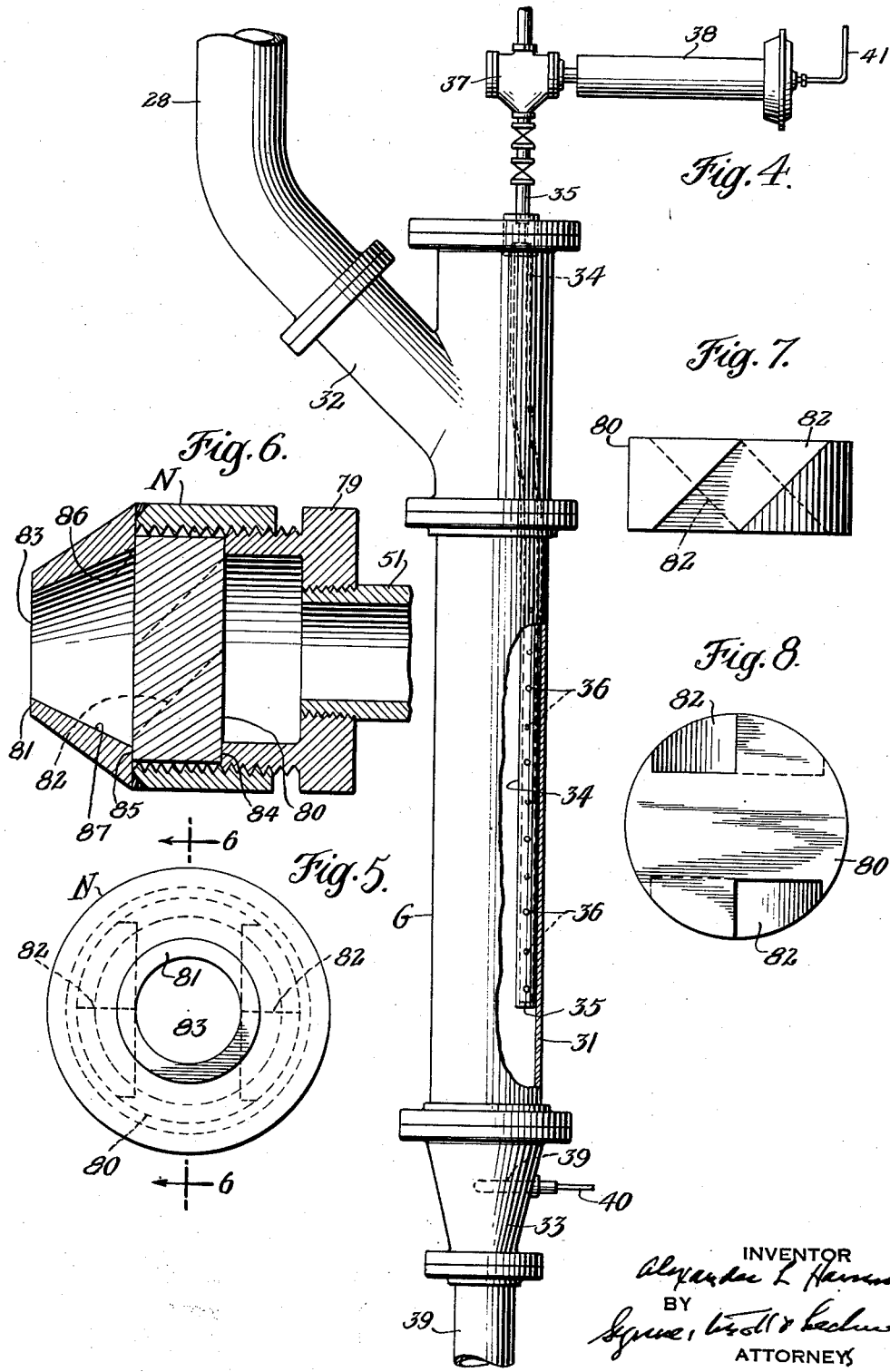
INVENTOR
Alexander L. Hamm
BY
ATTORNEYS Patented June 5, 1951

2,555,337

UNITED STATES PATENT OFFICE 2,555,337

CHEMICAL FURNACE AND RECOVERY UNIT

Alexander Leopold Hamm, New York, N. Y., assignor to Combustion Engineering-Superheater, Inc., a corporation of Delaware Application April 11, 1945, Serial No. 587,812

2 Claims. (Cl. 23—262)

This invention relates to a control system for installations for the recovery of heat and chemicals from the waste liquor obtained in the preparation of pulp from wood, and is particularly useful in connection with the so-called caustic soda or sulphate process. The nature, objects and advantages of the invention will be best understood from the following.

Primarily, a recovery unit of the character herein described is a smelter to burn and reduce the dry solids contained in the waste liquors and thus to recover chemicals therefrom. The steam produced in the boiler is a by-product. Such units are self-sustaining, i. e., except in starting up, ordinarily no additional heat is required over that which is derived from the burning of combustibles in the waste liquor.

Irregular flow of liquor to the furnace does not impair smelter operation particularly if proper control of the condition of the liquor and its distribution in the furnace are maintained, but it does seriously affect the generation of the steam. Wide ranging fluctuations tend toward constant disturbance of external conditions and lower possible efficiencies within the unit. Although variations in liquor supply cause an irregular ash bed on the smelter hearth, continuity of operation, and self-supporting conditions must be maintained. But any means which permit the bed to vary in size, shape or arrangement leads to unequal forms of ash accumulations. Therefore, proportioned weights of fuel, as liquid, for a fixed or set air supply, as admitted through fixed air ports in the furnace walls, is difficult. Consequently, the proper control of the reducing atmosphere in the hearth with its correct hearth temperatures is difficult. Chemically, conditions such as the foregoing lower the average reduction of sodium sulphate to sodium sulphide. Physically, unstable and dark spots or wet spots will appear, requiring frequent adjustments to either shut off the liquor feed, add auxiliary fuel or adjust the air supply.

Another troublesome result of inadequate control is the condition of the upper furnace and boiler sections. It is highly important that means for supplying control be such that the particles of black ash formed be in heavy and relatively coarse particles, which enclose or seal the chemical to carry the latter to the hearth, instead of breaking the liquor into atomized form. Finely atomized particles, as produced by high pressures and high temperatures, expose an infinitely large surface in the form of very fine grains, which, in the hot zones of the furnace, sublimate and pass outward as a gas or fume. This condition causes, first, excess deposit on the boiler surfaces in condensing the chemical; second, severe smelting and restricting of the boiler passes; and finally, an objectionable loss of chemical to the stack.

To meet the conditions thus far described, it has been customary to employ one of the following methods. Either to finely atomize the liquor by pressure and high temperatures, say, for example, pressures of around 70 p. s. i. and temperatures around 300° F.; or to finely atomize by mechanical means, high temperature liquors; or to coarsely spray liquors at low density, say, for example, 55% or less, at temperatures around 205° F. to 225° F., with impingement of the liquors on a furnace wall or walls.

None of these provisions is adequate, particularly for present high steam pressures and temperatures with steady output of steam.

Another difficulty encountered is the fact that the liquors vary from mill to mill and from locality to locality. There are variable ashing tendencies, viscosities and skin tensions. Frequently, in the same mill the waste liquors from pulps of different species of wood will vary.

Moreover, rates of firing may vary, within the limits of self-sustaining operation.

One of the primary objects of the invention is to effectively meet all of the variables ordinarily encountered in operation while at the same time overcoming the difficulties hereinbefore pointed out and keeping the recovery unit in step or balance with the pulp mill.

To this end I provide a system which is in part self-adjusting and in part quickly and readily manually adjustable.

More specifically, it is an object of the invention to effectively and accurately control the regulation of temperature, pressure and density of high density liquors to assure formation of satisfactory black ash or char for the fuel bed on the hearth, to prevent loss of chemical through the boiler and to prevent flashing of the heavy liquor in the feed lines and pump as well as excessive flashing at the delivery nozzles of the furnace.

How the foregoing, together with such other objects and advantages as may hereinafter appear, or are incident to my invention, are realized is illustrated in the accompanying drawings, wherein—

Fig. 2 is an enlarged fragmentary elevational view of a nozzle arrangement employed in the practice of the invention;

Fig. 3 is a fragmentary sectional view taken substantially on the line 3—3 of Fig. 2;

Fig. 4 is an enlarged elevational view, partly in section, of a heater employed in the invention;

Fig. 5 is an enlarged face view of a nozzle I employ;

Fig. 6 is a sectional view taken on the line 6—6 of Fig. 5;

Fig. 7 is a plan view of a member of the nozzle shown in Figs. 5 and 6; and

Fig. 8 is a face view of Fig. 7.

Figure 1:
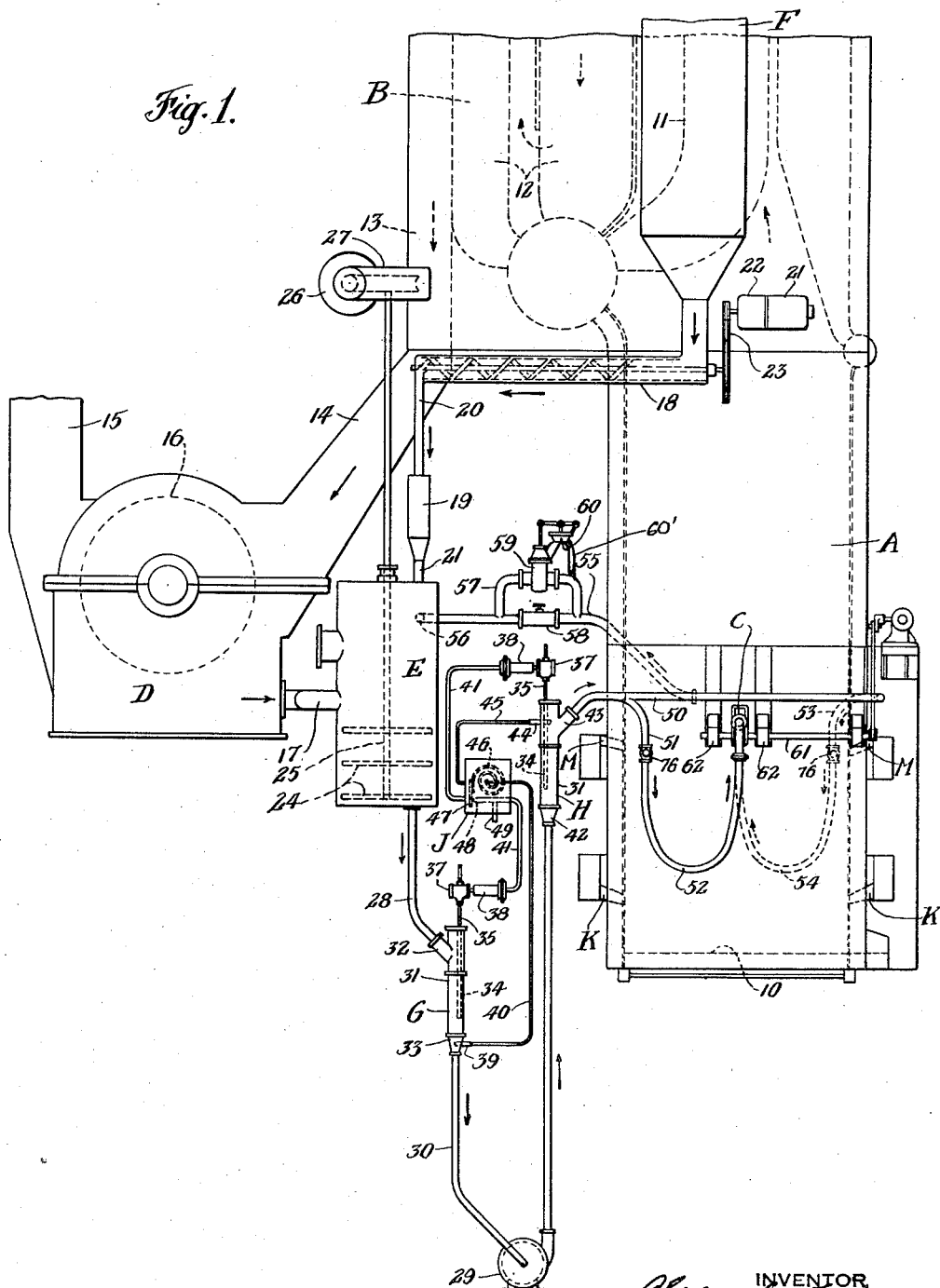
Fig. 1 is a more or less diagrammatic elevational view of a recovery system embodying my invention.

Referring now to Fig. 1, my recovery system comprises in general a furnace A, a steam boiler B, nozzle means indicated as a whole by the reference letter C, an evaporator D, a mixing tank E, a storage tank F, a first heater G, a second heater H, a temperature control device J, air nozzles K located adjacent the hearth of the furnace for admitting air for combustion thereto, and air nozzles M located at a level above the nozzles K for admitting additional air into the furnace.

The furnace A is of the general type shown in my United States Patent 2,319,339, issued May 18, 1943, and black liquor is sprayed thereinto by the nozzle means C where it partially or completely dries and falls onto the hearth 10 as a black ash and there burns while reactions take place resulting in the recovery of chemical. The products of combustion rise from the furnace and flow in several up and down passes over and among the banks of tubes 11 and 12 of the boiler B and then are led from the last pass 13 into the evaporator D by means of a conduit 14. The hot gases are led from the evaporator to a stack by means of a conduit 15.

The evaporator D contains a body of black liquor and is provided with a multiplicity of revolving disks 16 which dip into the body of liquor and expose a film of liquor to the gases to evaporate water of the liquor and to wash the gases by the adhesion of entrained solids onto the wet disks. The plates in revolving bring the surface liquor thereon, which is of greater density than the body of liquor in the evaporator, back into the body of liquor so that its density is increased. When the density of the liquor has reached a desired degree, it flows into the salt cake mixing tank E by means of the pipe 17.

The mixing tank E is provided with make up salt from the silo or storage tank F by means of a screw conveyor 18 which feeds the salt cake to a screen chamber 19 by means of conduit 20 and from said chamber to the mixing tank by a conduit 21. The screw conveyor may be driven at various speeds by means of a motor 21, reduction gearing 22 and chain drive 23. The mixing tank is provided with paddles 24 mounted on a shaft 25 driven by means of a motor 26 and reduction gearing 27.

The mixture of salt cake and heavy black liquor is led by means of a conduit 28 from the mixing tank E to the heater G where it is heated to reduce its viscosity to the point for efficient handling by a variable speed pump 29 to which it is led by a conduit 30, it being pointed out that high viscosity of the liquor would require excessive power to pump. This heating, however, is kept below the point where the mixture would flash within the suction end of the pump.

The heater G comprises a tubular body 31 having a liquor inlet 32, a liquor outlet 33 and a steam pipe 34 arranged in longitudinal alignment with the flow of the liquor through the heater. The steam pipe 34 has its end 35 closed and is provided with a multiplicity of holes 36 through which steam passes into the liquor. This provides internal or direct heating which is important in obtaining maximum practicality of the system. Steam is supplied to the steam pipe 34 at its upper end by means of an inlet pipe 35ª, the supply being controlled by a valve 37 which in turn is controlled by means of a diaphragm motor 38. A thermostatic device 39 provided at the outlet end 33 of the heater is connected by means of the shaft of a Bourdon control 40 to a temperature control device J for controlling the pressure of a fluid passing through tube 41 to the diaphragm motor 38 of the valve 37. The temperature of this heater is from substantially 190° F. to 215° F.

The liquor after leaving the first heater G is led to the pump 29 above referred to and is then delivered by the pump into a second heater H similar in construction to the heater G, it being noted, however, that the liquor is led into this heater at its lower end 42 and leaves at its upper end 43. Steam is supplied to this heater in the same manner as it is supplied to the first heater G, namely by means of a steam pipe 34 controlled by a valve 37 and diaphragm motor 38. A thermostatic device 44 provided at the outlet end 43 of the heater is connected by means of a separate Bourdon control 45 to the temperature control device J. The temperature of the second heater is preferably from substantially 235° F. to 238° F.

In connection with these heaters, it is pointed out that the liquor or mixture has free flow therethrough due to the direct heating and to some extent also to the parallel arrangement of the steam pipe, since there are no transverse members to be encountered in the flow of the liquor as would be the case if heaters of the usual tubular type were employed and in which the heat is transmitted through the steam pipe walls (external or indirect heating). In the usual type of heaters operating difficulties are encountered because the sodium sulphate or salt cake stirred into the streams of liquor for make up, deposits on the tubes and eventually clogs the heaters.

It is pointed out that the addition of water to the liquor in the heaters is very undesirable and therefore I employ steam high in heat content, so that the amount of water added to the liquor by the condensation of the steam becomes negligible.

The temperature control means J above referred to, operate in a manner so that the steam added to each heater is made responsive in quantity to the temperature of the liquor leaving the heater, it being noted in this connection that the control means controls the pressure of the fluid in the pipes 41 which lead to the diaphragm motors 38 and that the operation of the control means is subject to the temperature of the liquor leaving the heaters by reason of the thermostatic device 39 and 44.

This control means J may be of a well known type such as is diagrammatically illustrated in Fig. 1 in which expansion of the Bourdon operated tube 46 in response to temperature changes at the heater outlet actuates a member 47 to control an outlet opening 48 in the pressure line 41. The pressure line 41 is supplied with fluid under constant pressure by means of an inlet 49. It will be seen that by varying the escape of fluid from the pressure line 41 through the outlet opening 48, the pressure within the line will vary and this variation is transmitted to the diaphragm motor 38 of the steam valve 37. Thus the temperature control means J controls the steam flow to the heater and thereby the temperature of the liquor. A separate control means such as just described is provided for each heater and they may be mounted in a common box as shown in Fig. 1.

The liquor leaving the second heater H is at a suitable temperature and pressure for delivery to the furnace nozzles C by means of the pipe 50 which extends around the furnace so as to supply all of the nozzles. In this instance, I have shown two nozzles, one at the front wall and the other at the rear wall of the furnace (the rear nozzle being located directly in back of the front nozzle as viewed in Fig. 1), although it is to be understood that the number of nozzles employed may be varied according to the size of the installation. A branch pipe 51 leads from the pipe 50 and has a flexible hose connection 52 with the nozzle C at the front wall of the furnace. Similarly another branch pipe 53 leads from the pipe 50 and has a flexible hose connection 54 with the nozzles at the rear wall of the furnace.

At the rear of the furnace the pipe 50 is connected to a pipe 55 which connects into the mixing tank E at 56. A high velocity of flow is maintained in the pipe line 50, 55, in order to avoid cooling of the liquor and possible clogging. The pipe 55 is provided with a by pass connection 57 through which liquor may be forced by closing a valve 58. The by-pass 57 has a pressure regulating valve 59 therein which is controlled by a diaphragm motor 60 responsive (by means of a small pipe 60') to the pressure in line 55 ahead of the valve 59 with respect to the liquor flow therethrough, so that the valve will control the pressure in the line 50 and in the nozzles C.

Referring now to Figs. 2 and 3, it will be seen that the nozzle C is mounted for oscillation through an arc in a vertical plane by means of a rock shaft 61 mounted in suitable bearings 62 secured to the furnace structure. The nozzle is adjustably secured to the oscillating shaft by means of clamping mechanism comprising a lower clamp member 63 secured to the oscillating shaft 61 by means of U bolts 64 and an upper clamp member 65 pivotally connected to the lower member 63 by means of a pin 66. The clamp engages the nozzle pipe 67 which is secured firmly in place by the nut 68 having a handle 69. In Fig. 3 I have shown the nozzle adjusted into a horizontal position, but it will be seen that it may be adjusted to point upwardly or downwardly by loosening the U bolts 64 and rotating it on the oscillating shaft.

Oscillating movement is imparted to the oscillating shaft by means of a variable speed motor 70 having suitable reduction gearing in a casing 71, a crank 72 and a connecting rod 73 connected at its upper end to the crank 72 and at its lower end to an arm 74 secured to the rock shaft 61. The arm 74 is provided with a number of holes 75 whereby the amplitude of oscillation of the nozzle may be varied as desired.

A control valve 76 is provided in the pipe 51 which connects to the nozzle. I also provide a steam inlet 77 in the connection 78 for the purpose of blowing out the pipes when the furnace is shut down.

Referring now to Figs. 5 to 8 inclusive, the nozzle tip indicated as a whole by the reference letter N comprises a head 79 secured on the nozzle pipe 51, a breaker plate 80 and a tip member 81. The breaker plate 80 is provided with a pair of oppositely inclined angular ports 82 arranged to give the liquor a whirl as it passes through the discharge opening 83 of the tip member 81. This breaker plate is clamped between a shoulder 84 provided by the head 79 and an internal shoulder 85 provided in the tip members 81 and may be readily removed by unscrewing the tip member.

By way of example, it has been found that best results are obtained from the nozzle with the discharge opening 83 of ¾″ to 1″ in diameter, with the internal diameter at 86 approximately 1¾″ to 2″, with a tip having its inside surface 87 of conical form of approximately 20 to 35 degrees with respect to its axis, and with the ports 82 of the breaker plate 80 approximately ⅝″ square in cross section and disposed at an angle of approximately 35 to 45 degrees with respect to its axis. The variations between the limits of the above dimensions and angles are dictated by the characteristics of liquors of different pulps which may be employed. It has been found that with nozzles as above described relatively low pressures of the order of about 10 to about 25 p. s. i. will provide excellent ashing conditions within the furnace.

It is pointed out that in installations employing small furnaces stationary liquor nozzles may be employed with satisfactory results in the distribution of the black ash over the hearth. However, in installations employing large furnaces, a multiplicity of oscillating nozzles are employed, the number of which and the proportions of the nozzles and breaker plates determine the spread size and character of the liquor spray entering the furnace.

It will be seen from the foregoing remarks that the various controls described cooperate to coordinate the various elements of the installation so that the liquor is delivered into the furnace in a coarse spray suspended in space whereby the course globules and flakes of liquor are dried sufficiently while in suspension to cause them to fall onto the hearth as a so-called ash to be burned.

In operation, the variable speed motor 29 is adjusted to deliver liquor (preferably at a density of from approximately 60% to 70% solids), in accordance with the particular rate of combustion. Should the temperature of the liquor in the heaters drop below the particular setting of the thermostats 39 and 44 (as determined by the particular liquor being handled), the devices J operate to increase the amount of steam delivered to the heaters and if the temperature goes up, the devices J operate to reduce the amount of steam, and thus to maintain the desired temperature. By having pipe 50 lead to pipe 55 which, in turn, leads to the mixer E, free flow of the liquor is ensured, irrespective of the adjustment of the nozzles. The nozzles may be adjusted to meet particular conditions, as hereinbefore described, and will deliver the liquor in the form of a circular sheet or cone, which can be varied to suit the particular liquor. The openings can be adjusted by substituting parts of different size. Likewise, if conditions are such that the delivery pressure at the nozzles may be kept for relatively long periods at a given pressure, this given pressure, for the particular setting of the nozzles, may be maintained, as, for example, by closing valve 58 and adjusting the loading of valve 59 in the by-pass 57, etc., etc.

Thus, it will be seen from the foregoing that the control system is not only very flexible but can be altered so as to secure efficiency of operation under a variety of conditions without danger of clogging, flashing, etc. The nozzle pressure is low as compared to the high pressures heretofore used, and thus power ingredients, maintenance, etc. are reduced. The temperatures are also relatively lower. I usually obtain excellent results with temperatures between about 235° F. and about 238° F., although the band may vary somewhat, say from 180° F. to about 240° F. I prefer nozzle pressures of from about 10 lbs. to about 25 lbs.

The invention is also applicable to the sulphite waste liquors.

I claim:

1. In a self-sustaining unit for recovering heat and chemical from waste wood pulp liquor, comprising, in combination with a furnace having a fuel delivery nozzle, means adapted to hold and supply waste liquor of at least 60% solids content, and a line extended from the source to the nozzle; a pump in said line for delivering liquor to the nozzle under pressure, a controllable steam injector heater in said line in advance of the pump providing for controlled increase in temperature of the liquor to a value providing effective and efficient pump operation, and a controllable steam injector heater in said line between the pump and the nozzle providing for controlled increase in temperature of the liquor from the pump delivery temperature up to the value providing for efficient delivery and burning of the liquor in the furnace.

2. A construction according to claim 1 and further including a steam control device for the first heater responsive to the temperature of the liquor in the line between the first heater and the pump, and a steam control device for the second heater responsive to the temperature of the liquor in the line between the second heater and the delivery nozzle.

ALEXANDER LEOPOLD HAMM.

REFERENCES CITED

The following references are of record in the file of this patent:

UNITED STATES PATENTS

| Number | Name | Date |
| --- | --- | --- |
| 1,326,414 | Moore | Dec. 30, 1919 |
| 1,933,255 | Goodell | Oct. 31, 1933 |
| 2,086,808 | Kallam | July 13, 1937 |
| 2,213,052 | Rosencrants | Aug. 27, 1940 |